United States Patent [19]
Hanggi et al.

[11] Patent Number: 5,876,595
[45] Date of Patent: Mar. 2, 1999

[54] ADSORPTION MEDIUM AND METHOD OF PREPARING SAME

[75] Inventors: Douglas A. Hanggi, St. Paul; Gaddam N. Badu; Terry L. Davis, both of Woodbury, all of Minn.

[73] Assignee: Minnesota Mining and Manufacturing Company, St. Paul, Minn.

[21] Appl. No.: 821,892

[22] Filed: Mar. 21, 1997

Related U.S. Application Data

[62] Division of Ser. No. 585,369, Jan. 11, 1996, Pat. No. 5,667,674.

[51] Int. Cl.$^6$ .................................................. B01D 15/08
[52] U.S. Cl. .................................... 210/198.2; 210/502.1; 210/635; 210/656; 502/402
[58] Field of Search .................... 210/635, 656, 210/658, 198.2, 502.1; 502/402; 428/405

[56] References Cited

U.S. PATENT DOCUMENTS

| | | | |
|---|---|---|---|
| 2,448,391 | 8/1948 | Pyle | 260/86 |
| 3,586,626 | 6/1971 | Heitz et al. | 210/635 |
| 3,722,181 | 3/1973 | Kirkland et al. | 210/198.2 |
| 4,564,576 | 1/1986 | Saigo et al. | 430/197 |
| 4,591,608 | 5/1986 | Okimoshima | 522/13 |
| 4,602,050 | 7/1986 | West et al. | 522/135 |
| 4,705,725 | 11/1987 | Glajch et al. | 428/405 |
| 4,783,516 | 11/1988 | Schilling, Jr. et al. | 528/14 |
| 4,904,632 | 2/1990 | Pesek et al. | 502/158 |
| 5,015,375 | 5/1991 | Carr et al. | 210/198.2 |
| 5,026,893 | 6/1991 | Pacioret et al. | 556/435 |
| 5,035,803 | 7/1991 | Cohen | 210/656 |
| 5,100,547 | 3/1992 | Hardiman et al. | 210/198.2 |
| 5,108,597 | 4/1992 | Funkenbusch et al. | 210/198.2 |
| 5,141,634 | 8/1992 | Carr et al. | 210/198.2 |
| 5,182,016 | 1/1993 | Funkenbusch et al. | 210/198.2 |
| 5,194,333 | 3/1993 | Ohanaka | 210/198.2 |
| 5,447,624 | 9/1995 | Ichikawa | 210/198.2 |

FOREIGN PATENT DOCUMENTS

| | | | |
|---|---|---|---|
| 0 436 179 A1 | 7/1991 | European Pat. Off. | 210/198.2 |
| 495 763 | 10/1970 | Sweden . | |
| 735405 | 8/1953 | United Kingdom | 210/198.2 |
| 1 456 865 | 12/1976 | United Kingdom | 210/198.2 |
| WO 91/04095 | 4/1991 | WIPO | 210/198.2 |
| WO 95/04012 | 2/1995 | WIPO | 210/198.2 |

OTHER PUBLICATIONS

Abstract for 63091123, Japan, Derwent, 1988.
Unger, *Porous Silica: Its Properties and Use as Support in Column Liquid Chromatography*, Elsevier Scientific Publishing Co., Amsterdam, NY (1979), pp. v–vii and 57–147.
B.B. Wheals, *Chemically Bonded Phases for Liquid Chromatography Modification of Silica With Vinyl Monomers*, Journal of Chromatography 107(2) 1976, pp. 402–406.
Muzafarov et al., *Organosilicon Dendrimers: Volume–Growing Polyallylcarbosilanes*, Polymer Science (Russian Edition) vol. 35 No. 11, 1993, pp. 1575–15780.
Saigo, et al., *Radical Cyclopolymerications of DiallyIsilanes and TriallyIsilanes*, Journal of Polymer Science, Part A:Polymer Chemistry, vol. 26, 2085–2097 (1988), pp. 2085–2097.
Unger, *Packings and Stationary Phases in Chromatographic Techniques*, Marcel Dekker Inc., New York (1990), pp. 330–470.
Sandoval et al., *Hydrolytically Stable Bonded Chromatographic Phases Prepared Through Hydrosilation of Olefins on a Hydride–Modified Silica Intermediate*, Anal. Chem, 63 (1991), pp. 2634–2641.
Pesek et al., *Evaluation of Synthetic Procedures for the Chemical Modification of Alumina for HPLC*, Chromatographia 28(11/12) Dec. 1989, pp. 565–568.
Schomburg, Lc–*Stationary Phases in High Performance Liquid Chromatography*, GC Mag. 6(1) 1988, pp. 36–50.
Search Report for PCT/US96/07516, May 23, 1996.

*Primary Examiner*—Ernest G. Therkorn
*Attorney, Agent, or Firm*—Gregory J. Feulner

[57] ABSTRACT

An adsorption medium that includes a finely divided substrate provided on at least a portion of its surface with the polymerization product of a silane that includes (a) two or three olefinic groups having the formula $-(CH_2)_m CH=CH_2$, where m is between 0 and 3, inclusive, and (b) at least one ligand selected to interact with a substance brought into contact with the adsorption medium to adsorb at least a portion of the substance on the surface of the adsorption medium.

11 Claims, No Drawings

5,876,595

ADSORPTION MEDIUM AND METHOD OF PREPARING SAME

This is a division of application Ser. No. 08/585,369 filed Jan. 11, 1996, now U.S. Pat. No. 5,667,674.

FIELD OF THE INVENTION

This invention relates to adsorbing one or more substances on the surface of a finely divided substrate.

DESCRIPTION OF RELATED ART

Finely divided oxides (e.g., $Al_2O_3$, $SiO_2$, $TiO_2$, and $ZrO_2$) have been used as adsorption media, including chromatographic support materials. The silanization of the surfaces of these materials provides a convenient way of introducing a variety of ligands onto the oxide surface. Such ligands interact with substances applied to the adsorption medium to cause selective adsorption.

One problem with the treated surfaces is that the bonded phase produced by silanization is stabilized by siloxane linkages. These linkages are susceptible to hydrolysis, particularly under strongly acidic or basic conditions, resulting in release of silane from the oxide surface and concurrent loss of adsorptive ability.

SUMMARY OF THE INVENTION

In a first aspect, the invention features an adsorption medium that includes a finely divided substrate provided on at least a portion of its surface with the polymerization product of a silane that includes (a) two or three olefinic groups having the formula $-(CH_2)_mCH=CH_2$, where m is between 0 and 3, inclusive, and (b) at least one ligand selected to interact with a substance brought into contact with the adsorption medium to adsorb at least a portion of the substance on the surface of the adsorption medium.

In preferred embodiments, the adsorption medium is in the form of a chromatographic support material and the ligand is a chromatographically useful ligand. The polymerization product preferably has a carbosilane backbone that is essentially free of siloxane linkages.

The polymerization product may be the homopolymerization product of the silane monomer or it may be a copolymer of the silane monomer and one or more co-monomers, e.g., a trihydrosilane. In some preferred embodiments, the polymerization product is covalently bonded to at least a portion of the surface of the substrate, whereas in other preferred embodiments, the polymerization product is physically deposited on at least a portion of the surface of the substrate. Examples of preferred substrates include $Al_2O_3$, $SiO_2$, $TiO_2$, and $ZrO_2$, and combinations thereof.

Preferred silanes feature three olefinic groups having the formula $-(CH_2)_mCH=CH_2$, where m is between 0 and 3, inclusive. Particularly preferred are olefinic groups having the formula $-CH_2CH=CH_2$ (m=1) and $-CH=CH_2$ (m=0). Examples of preferred ligands include hydrogen, a halogen (e.g., F, Cl, Br, or I), an alkoxy group (e.g., having between 1 and 3 carbon atoms, inclusive, such as a methoxy or ethoxy group), an aryl group (e.g., a phenyl or naphthyl group), a derivatized aryl group (e.g., an aminoaryl, haloaryl, hydroxyaryl, mercaptoaryl, cyanoaryl, phosphonoaryl, or carboxyaryl group having between 1 and 18 carbon atoms, inclusive), an alkyl group (e.g., having between 1 and 22 carbon atoms, inclusive, such as an octyl or octadecyl group), or a derivatized alkyl group (e.g., an aminoalkyl, haloalkyl, hydroxyalkyl, mercaptoalkyl, cyanoalkyl, phosphonoalkyl, or carboxyalkyl group having between 1 and 18 carbon atoms, inclusive). Other examples of derivatized alkyl and aryl groups include alkyl or arylbound cyclodextrans, crown ethers, and chiral molecules. Specific examples of preferred silanes include triallyloctadecylsilane, trivinyloctadecylsilane, triallyoctylsilane, and trivinyloctylsilane.

In a second aspect, the invention features a method of preparing the above-described adsorption media that includes the steps of contacting a finely divided substrate with the above-described silanes and polymerizing the silane on at least a portion of the surface of the substrate.

In one preferred embodiment of this method, the substrate is contacted with the silane and a trihydrosilane, and the two are copolymerized with each other on at least a portion of the surface of the substrate. In yet another preferred embodiment, the surface of the substrate is pre-treated to create surface-bonded groups that can react with the silane.

The invention also features a chromatography apparatus (e.g., a column or bed) that includes a chromatographic support material as the stationary phase, in which the support material includes a finely divided substrate provided on at least a portion of its surface with the polymerization product of a silane that includes (a) two or three olefinic groups having the formula $-(CH_2)_mCH=CH_2$, where m is between 0 and 3, inclusive, and (b) at least one chromatographically useful ligand.

In this application:

A "finely divided substrate" refers to a particulate material in which the particle size is selected to yield an overall surface area sufficient to enable the material to function as an adsorbent medium on a practical scale. Particle diameters typically range from about 0.1 to about 500 micrometers, although particles having diameters less than 0.1 micrometer and greater than 500 micrometers can be used as well.

A "silane" refers to a compound in which a central silicon atom is bonded to four substituents, none of which are oxygen.

A "siloxane linkage" refers to a silicon-oxygen (Si—O) bond.

A "ligand" refers to a functional group bonded to the central silicon atom of the silane that does not participate in the polymerization reaction, but rather remains available as a pendent group following polymerization for interacting with a substance applied to the adsorption medium. A "chromatographically useful ligand" is a ligand that interacts with substances applied to a chromatography apparatus (e.g., a column or bed) to cause selective adsorption (and thus separation of the material or materials of interest).

A "derivatized alkyl group" refers to an alkyl group in which one or more of the hydrogen atoms are replaced with a different functional group. Examples of common functional groups include amino, halogen, hydroxyl, mercaptyl, cyano, phosphonyl, and carboxyl groups.

A "derivatized aryl group" refers to an aryl group in which one or more of the hydrogen atoms are replaced with different functional groups. Examples of common functional groups include amino, halogen, hydroxyl, mercaptyl, cyano, phosphonyl, and carboxyl groups.

"Essentially free of siloxane linkages" refers to the polymerization product of a silane monomer (and, optionally, one or more co-monomers) in which the number of Si—O linkages in the carbosilane (i.e., —C—Si—) backbone of the polymer (as opposed to pendent groups attached to the carbosilane backbone) is sufficiently low such that the hydrolytic stability of the resulting polymer is not substantially impaired.

The invention provides silane-derivatized, finely divided support materials useful as adsorption media, e.g., chromatographic columns and beds. Reacting silanes having two or three olefinic groups improves the hydrolytic stability of the materials, particularly upon exposure to strongly acidic or basic conditions, because the resulting polymerization product is essentially free of siloxane linkages in its backbone: such linkages are particularly susceptible to hydrolysis.

DESCRIPTION OF PREFERRED EMBODIMENTS

The invention features an adsorbent medium in which a finely divided substrate contains on at least a portion of its surface the polymerization product of (a) one or more silane monomers and (optionally) (b) one or more non-silane monomers. The substrate particles preferably are substantially spherical particles. Both porous and non-porous particles can be used, with porous particles being preferred. The average pore diameter of the porous particles (as measured by nitrogen adsorption) ranges from about 20 Å to about 4000 Å, preferably from about 50 Å to about 1000 Å, and more preferably from about 60 Å to about 500 Å. In addition, the porosity of the individual particles preferably ranges from about 10–90%, more preferably from about 20–80%, and even more preferably from about 30–70%.

Particle diameters typically range from about 0.1 micrometer to about 500 micrometers. In the case of non-porous particles, the particle diameters preferably range from about 0.1 micrometer to about 20 micrometers, more preferably from about 0.5 micrometer to about 10 micrometers, and even more preferably from about 1 micrometer to about 3 micrometers. For porous particles, the preferred particle diameters are in the range of about 1 micrometer to about 25 micrometers, and more preferably in the range of about 3 micrometers to about 6 micrometers.

Suitable materials for the finely divided substrate are well-known and include both organic and inorganic materials. Preferably, however, the finely divided substrate is selected from oxides and mixed oxides of silicon, aluminum, titanium, and/or zirconium. These materials may further include minor proportions of additives such as stabilizers and processing aids, or other oxides (e.g., oxides of boron, cerium, hafnium, or yttrium). Particularly preferred are silica ($SiO_2$), zirconia ($ZrO_2$), and admixtures thereof. Also suitable are the materials described in the following patents, all of which are incorporated by reference: Carr et al., U.S. Pat. No. 5,015,373 (polymer clad materials); Carr et al., U.S. Pat. No. 5,141,634 (phosphate-coated materials); and Funkenbusch et al., U.S. Pat. No. 5,108,597 (carbon-clad particles).

The silane monomer contains four substituents bonded to a central silicon atom. Two or three of those substituents (with three being preferred) are olefinic substituents having the formula —$(CH_2)_m CH=CH_2$, where m is between 0 and 3, inclusive. Examples of preferred groups are vinyl groups (m=0) and allyl groups (m=1). The olefinic groups may be the same as, or different from, each other. Polymerization proceeds through the double bond of the olefinic substituent, resulting in a polymer having a carbosilane backbone that is essentially free of siloxane linkages.

At least one of the remaining substituents bonded to the central silicon atom is a ligand designed to impart selective adsorptive capabilities to the polymerized product. A wide variety of ligands may be used, with the particular choice of ligand being a function of the use to which the adsorbent medium will be put (i.e., the type of material that the medium is designed to adsorb). Suitable ligands are well-known and include those described in the Summary of the Invention, above.

The silane monomers are generally prepared by reacting an olefinic organometallic reagent with an appropriate n-alkyl tri- or di-halo silane. Suitable organometallic reagents include olefinic Grignard reagents and olefinic lithium reagents.

Polymerization of the silane monomers is carried out in the presence of the finely divided substrate material and an initiator according to known polymerization techniques, including thermal-, ultraviolet-, gamma ray-, ionic-, or coordination ionic-initiated polymerization. Suitable initiators are described in the aforementioned Carr and Funkenbush patents, and include peroxides (e.g., benzoyl peroxide and dicumyl peroxide), ultraviolet sensitizers (e.g., 2,2'-dimethoxy-2-phenyl acetophenone), and platinum catalysts (e.g., chloroplatinic acid and bis(divinyltetramethyldisiloxane Pt).

The silane monomer may be copolymerized with one or more co-monomers, including both silane and non-silane co-monomers. Examples of useful co-monomers include alkyl trihydrosilanes, alkenyl trihalosilanes (e.g., allyl trichlorosilane), vinyl phosphonate, 1,2-epoxy hexene, and allyl glycidyl ether. Particularly preferred co-monomers are alkyl trihydrosilanes such as octadecyl trihydrosilane.

The silane monomer(s) and, optionally, non-silane monomers can be polymerized directly onto the surface of the substrate, in which case the polymerization product is not chemically bonded to the substrate surface. The substrate surface may also be pre-treated to introduce surface-functional groups, e.g., vinyl groups, that can react with the silane monomer(s) during the polymerization reaction to create side chains that covalently bond the final polymer to the substrate surface. These side chains may include siloxane linkages bonding the side chains to the substrate surface. The presence of such linkages does not substantially impair the overall hydrolytic stability of the product so long as the carbosilane polymer backbone itself is essentially free of such linkages.

The final product is useful as an adsorbent medium in a variety of settings. It is particularly useful as a chromatographic support material forming the stationary phase of a normal or reversed phase high performance liquid chromatography (HPLC) column or bed, as well as an ion-exchange HPLC column or bed. It may also be combined with a binder and used to coat a glass or plastic plate for use in thin layer chromatography. In addition, it may be used to immobilize biologically active materials (e.g., enzymes or antibodies) for a variety of purposes, including catalysis, analysis, affinity chromatography, synthetic transformations, and remediation.

Objects and advantages of this invention are further illustrated by the following examples, but the particular materials and amounts thereof recited in these examples, as well as other conditions and details, should not be construed to limit this invention. All parts and percentages are by weight unless otherwise indicated.

EXAMPLES

Examples 1–15 describe the preparation of silane monomers. Structures of the silane monomers described in these Examples are summarized in Table 1, below.

(available as Omnisolve reagent grade from E. Merck, Gibbstown, N.J.). The diluted solution was then stirred.

Next, the addition funnel was replaced with a similar 100 ml funnel containing 0.136 mole (52.7 grams) of octadecyl

TABLE 1

| Triolefinic silanes: Silane Structure | Name: | Abbreviation | Formula: | FW: | Example |
|---|---|---|---|---|---|
| (CH₂=CH)₃Si-C₁₇H₃₅ | trivinyl octadecyl silane | TVOdS | $C_{24}H_{46}Si$ | 362.72 | 1 |
| (CH₂=CHCH₂)₃Si-C₁₇H₃₅ | triallyl octadecyl silane | TAOdS | $C_{27}H_{52}Si$ | 404.80 | 2 |
| (CH₂=CHCH₂CH₂)₃Si-C₁₇H₃₅ | tributenyl octadecyl silane | TBOdS | $C_{30}H_{58}Si$ | 446.88 | 3 |
| (CH₂=CH)₃Si-C₇H₁₅ | trivinyl octyl silane | TVOcS | $C_{14}H_{26}Si$ | 222.45 | 4 |
| (CH₂=CHCH₂)₃Si-C₇H₁₅ | triallyl octyl silane | TAOcS | $C_{17}H_{32}Si$ | 264.51 | 5 |
| (CH₂=CHCH₂)₃Si-(CH₂)₃-Cl | triallyl (3-chloropropyl) silane | TACPS | $C_{12}H_{21}SiCl$ | 228.84 | 6 |
| (CH₂=CHCH₂)₃Si-(CH₂)₃-Br | triallyl (3-bromopropyl) silane | TABPS | $C_{12}H_{21}SiBr$ | 273.39 | 7 |
| (CH₂=CHCH₂)₃Si-(CH₂)₃-I | triallyl (3-iodopropyl) silane | TAIPS | $C_{12}H_{21}SiI$ | 320.29 | 8 |
| (CH₂=CHCH₂)₃Si-(CH₂)₃-N(Et)₂ | triallyl N,N-(diethylaminopropyl) silane | TADEAPS | $C_{16}H_{31}NSi$ | 265.52 | 9 |
| (CH₂=CHCH₂)₃Si-(CH₂)₃-P(OH)₂ | triallyl-(propyl phosphonic) acid silane | TAPPS | $C_{12}H_{23}O_2PSi$ | 258.37 | 10 |
| (CH₂=CHCH₂)₃Si-(CH₂)₃-O-CH₂CH(OH)CH₂OH | triallyl-(3-glyceryl-propyl) silane | TAGlPS | $C_{15}H_{28}O_3Si$ | 284.47 | 11 |
| (CH₂=CHCH₂)₃Si-(CH₂)₃-OH | triallyl-(3-hydroxy propyl) silane | TAHPS | $C_{12}H_{22}OSi$ | 209.5 | 12 |
| (CH₂=CHCH₂)₃Si-(CH₂)₂-C₆F₁₃ | triallyl fluoroalkyl silane | FATAS | $C_{17}H_{19}F_{13}Si$ | 498.40 | 13 |
| (CH₂=CH)₃Si-OCH₃ | trivinyl methoxy silane | TVMS | $C_7H_{11}OSi$ | 140.26 | 14 |
| (CH₂=CHCH₂)₃Si-OCH₃ | triallyl methoxy silane | TAMS | $C_{10}H_{18}OSi$ | 182.34 | 15 |

Example 1

Example 1 describes the preparation of trivinyl octadecyl silane.

A two liter, three-necked round bottom flask was oven dried and equipped with an inert (polytetrafluoroethylene) paddle mechanical stirrer, a 250 ml pressure equalizing addition funnel with inert stopcock, a reflux condenser and a gas inlet. The apparatus was flushed with dry nitrogen. A 0.42 mole (250 ml) sample of 15% vinyl magnesium chloride in tetrahydrofuran (available from Janssen Chimica of Geel, Belgium) was transferred to this flask via a double ended cannula; this solution is known as a Grignard reagent. It was further diluted with 600 ml of anhydrous cyclohexane trichlorosilane (available from United Chemical Technologies of Bristol, Pa.) which was added to the solution dropwise. The addition funnel was then rinsed with tetrahydrofuran into the reaction flask. Magnesium chloride precipitate formed as the silane was added to the Grignard solution. The resulting suspension was stirred for 4 hours under the flow of nitrogen gas. Silica gel (commercially available as Merck grade 9385, 230–400 mesh (38–63 micrometers) from Aldrich Chemical Co. of Milwaukee, Wis.) was washed with water and was then added to the slurry to quench remaining reagents. The silica gel and magnesium halide precipitate were removed by filtration through a bed of filtration enhancer (commercially available as Celite from Aldrich Chemical Co.) on a Buchner funnel. The bed was washed with three 100 ml portions of cyclohexane which were added to the filtrate, which was subsequently concentrated on a rotary evaporator. The remaining liquid was vacuum distilled at 168° C.–169° C. and 0.6 mm to yield the silane monomer.

The final distilled product was 95% pure as determined by capillary gas chromatography with flame ionization detection (GC/FID) using a 30 meter 5% phenyl methyl silicone column (commercially available as a DB-5 column from J&W Scientific of Folsom, Calif.). Spectroscopic evaluation using mass spectrometry, Fourier transform infrared spectroscopy (FTIR), and nuclear magnetic resonance spectroscopy (NMR) was consistent with octadecyl trivinyl silane.

Example 2

Example 2 describes the preparation of triallyl octadecyl silane.

Triallyl octadecyl silane was prepared as described in Example 1 except that 0.31 mole (155 ml) of 2M allyl magnesium chloride in tetrahydrofuran (commercially available from Aldrich Chemical Co. of Milwaukee, Wis.) was used in place of the vinyl magnesium bromide reagent to react with a 0.10 mole (38 grams) sample of octadecyl trichlorosilane (commercially available from United Chemical Technologies of Bristol, Pa.). The final triallyl octadecyl silane product was obtained by vacuum distillation at 191° C.–192° C. and 0.5 mm. It was 95% pure as determined by capillary GC/FID using a 30 meter DB-5 column. Spectroscopic evaluation using mass spectrometry, FTIR and NMR was consistent with octadecyl triallyl silane.

Example 3

Example 3 describes the preparation of tributenyl octadecyl silane.

A two liter, three-necked round bottom flask was oven dried and equipped with an inert (polytetrafluoroethylene) paddle mechanical stirrer, a 250 ml pressure equalizing addition funnel with inert stopcock, a reflux condenser and a gas inlet. The apparatus was flushed with dry nitrogen. A 3.96 gram sample of magnesium turnings (commercially available from Aldrich Chemical Co. of Milwaukee, Wis., 162 millimoles) was added to the flask and was warmed while flushing with dry nitrogen, after which 20 ml of dry tetrahydrofuran (commercially available from Burdick and Jackson of Muskeegon, Mich.) were added. A 22.0 gram sample of 4-bromo-1-butene (commercially available from Aldrich Chemical Co., 162 millimoles) was dissolved in an equal volume of dry tetrahydrofuran, and was added dropwise to the flask via the addition funnel.

Upon addition of the bromobutene, the flask was heated to maintain a reflux condition. An additional 50 ml of dry tetrahydrofuran was then used to rinse the funnel into the flask and the sample was refluxed for an additional hour. Next, 15.8 grams of octadecyltrichlorosilane (commercially available from Aldrich Chemical Co., 40.7 millimoles) was dissolved in 180 ml of cyclohexane (commercially available from Burdick and Jackson) and was transferred to the addition funnel via double ended cannula. The reaction flask was immersed in a water bath and the silane solution was added slowly over 2 hours, after which the addition funnel was rinsed with an additional 200 ml of cyclohexane. The reaction was stirred for 72 hours. The excess reagents were quenched by addition of silica gel, and the silica gel and magnesium halide precipitates were removed by filtration as described in Example 1. The filtrate was subsequently concentrated on a rotary evaporator to provide 21 grams of crude product. This material contained 23% tributenyl octadecylsilane.

The crude product was chromatographed on 100 grams of silica gel (commercially available from Aldrich Chemical Co.) using cyclohexane eluent to provide 5.2 grams of an oil consisting of 70% (as determined by capillary GC/FID) of tributenyl octadecylsilane. Spectroscopic evaluation using mass spectrometry, FTIR and NMR was consistent with tributenyl octadecylsilane.

Example 4

Example 4 describes the preparation of trivinyl octyl silane.

Trivinyl octyl silane was prepared as described in Example 1 except that 0.31 mole (298 ml) of 15% vinyl magnesium chloride in tetrahydrofuran (commercially available from Janssen Chimica, Geel, Belgium) was reacted with 0.16 mole (40 grams) of n-octyl trichlorosilane (commercially available from United Chemical Technologies of Bristol, Pa.) in place of the n-octadecyl trichlorosilane reagent used in Example 1. The final trivinyl octyl silane reagent was obtained by vacuum distillation at 75° C. and 1 mm. It was 98% pure as determined by capillary GC/FID using a 30 meter DB-5 column. Spectroscopic evaluation using mass spectrometry, FTIR and NMR was consistent with trivinyl octyl silane.

Example 5

Example 5 describes the preparation of triallyl octyl silane.

Triallyl octyl silane was prepared as described in Example 1 except that 0.60 mole (300 ml) of 2.0M vinyl magnesium chloride in tetrahydrofuran (commercially available from Aldrich Chemical Co. of Milwaukee, Wis.) was reacted with 0.19 mole (48 grams) of n-octyl trichlorosilane (commercially available from United Chemical Technologies of Bristol, Pa.) in place of the n-octadecyl trichlorosilane reagent used in Example 1. The final triallyl octyl silane reagent was obtained by vacuum distillation at 98° C. and 0.5 mm. It was 99% pure as determined by capillary GC/FID using a 30 meter DB-5 column. Spectroscopic evaluation using mass spectrometry, FTIR and NMR was consistent with triallyl octyl silane.

Example 6

Example 6 describes the preparation of triallyl-3-chloropropyl silane.

Triallyl chloropropyl silane was prepared using the equipment described in Example 1 except that a 3 L flask was used. The apparatus was flushed with nitrogen and was charged with 100 grams (0.47 mole) of trichloro (3-chloropropyl) silane (commercially available from Lancaster Synthesis Inc., Windham, N.H.). The silane reagent was diluted with 1200 ml of cyclohexane (commercially available as Omnisolve from E. Merck, Gibbstown, N.J.). The reaction flask was cooled in an ice bath while 732 ml (1.46 mole) of a 2M solution of allyl magnesium chloride in tetrahydrofuran (commercially available from Aldrich Chemical Co. of Milwaukee, Wis.) was added slowly through the addition funnel. The addition funnel was then rinsed with tetrahydrofuran. Magnesium chloride precipitate formed as the Grignard reagent was added to the silane solution.

The resulting suspension was stirred for 1 hour following addition of the Grignard reagent, at which point the ice bath was removed and the slurry was allowed to warm to room temperature. The slurry was then stirred overnight. Residual active reagents were quenched and the product collected by filtration as described in Example 1. The bed was washed with three 100 ml portions of cyclohexane which were added to the filtrate, which was subsequently concentrated on a rotary evaporator. The remaining liquid was vacuum distilled using a short path still at 0.6 mm. Tetra allyl silane impurities distilled off at about 78° C.–800° C., while the triallyl chloropropyl silane product distilled at 86° C. and 0.6 mm. Preparations for use as synthetic intermediates were obtained by pooling distillation fractions from 78° C.–86° C. since tetraallyl silane impurities were removed more readily in later synthetic steps.

The final distilled product was 98% pure as determined by capillary GC/FID using a 30 meter DB-5 column. This preparation contained 1–2% tetraallyl silane impurity. Spectroscopic evaluation using mass spectrometry, FTIR and NMR was consistent with triallyl chloropropyl silane.

Example 7

Example 7 describes the preparation of triallyl (3-bromopropyl) silane.

Triallyl bromopropyl silane was prepared using the apparatus described in Example 6. The nitrogen purged reaction flask was charged with 50 grams (0.20 mole) of trichloro (3-bromopropyl) silane (commercially available from Lancaster Synthesis Inc. of Windham, N.H.). The silane reagent was diluted with 800 ml of cyclohexane (commercially available as Omnisolve from E. Merck, Gibbstown, N.J.). The reaction flask was cooled in an ice bath while 303 ml (0.60 mole) of a 2M solution of allyl magnesium chloride in tetrahydrofuran (commercially available from Aldrich Chemical Co. of Milwaukee, Wis.) was added dropwise through the addition funnel over two hours. The addition funnel was then rinsed with tetrahydrofuran. Magnesium chloride precipitate formed as the Grignard reagent was added to the silane solution.

The resulting suspension was stirred for 1 hour following addition of the Grignard reagent, at which point the ice bath was removed and the slurry was allowed to warm to room temperature. The slurry was then stirred overnight. Residual active reagents were quenched and the product collected by filtration as described in Example 1. The bed was washed with three 100 ml portions of cyclohexane which were added to the filtrate, which was subsequently concentrated on a rotary evaporator. The remaining liquid was vacuum distilled using a short path still at 0.6 mm. Tetraallyl silane rich impurities distilled off at about 78° C.–80° C., while the triallyl bromopropyl silane product distilled at 94° C. and 0.6 mm. Preparations for use as synthetic intermediates were obtained by pooling distillation fractions from 78° C.–94° C. since tetraallyl silane impurities were removed more readily in later synthetic steps.

The final distilled product was 95% pure as determined by capillary GC/FID using a 30 meter DB-5 column. This preparation contained low levels of tetraallyl silane impurity. Spectroscopic evaluation using mass spectrometry, FTIR and NMR was consistent with triallyl bromopropyl silane.

Example 8

Example 8 describes the preparation of triallyl 3-iodopropyl silane.

Triallyl 3-iodopropyl silane was prepared by the Finkelstein transhalogenation reaction from chloropropyl silane prepared in Example 6. A 250 ml flask equipped with a stir bar and a reflux condenser was charged with 20 grams (90 millimoles) of triallyl (3-chloropropyl) silane (prepared as described in Example 6) and 100 ml of acetone (available commercially as Omnisolve Reagent grade from E. Merck, Gibbstown, N.J.). The silane solution was refluxed under positive nitrogen pressure with 40 grams (270 millimoles) of sodium iodide (available commercially from Aldrich Chemical Co. of Milwaukee, Wis.) for 18 hours. After cooling, the acetone solution was decanted from the insoluble iodide salts and was concentrated on a rotary evaporator to yield triallyl 3-iodopropyl silane, which was used without further purification.

Example 9

Example 9 describes the preparation of triallyl 3-(N,N-diethylaminopropyl) silane.

Triallyl 3-(N,N-diethylaminopropyl) silane was prepared from the triallyl(3-iodopropyl)silane intermediate prepared in Example 8. A 100 ml flask equipped with stir bar and reflux condenser was charged with 15 grams (44 millimoles) of triallyl(3-iodopropyl)silane (prepared as described in Example 8) and 50 ml of anhydrous acetonitrile (available commercially as Omnisolve from E. Merck of Gibbstown, N.J.). Diethyl amine (available commercially from Aldrich Chemical Co. of Milwaukee, Wis.) was added in about a five-fold excess (22.5 ml, 218 millimoles). The solution was stirred under positive nitrogen pressure for 5 hours.

Next, solvent was removed in vacuo, and the residue was taken up in 30 ml of cyclohexane (commercially available as Omnisolve from E. Merck). Aqueous 2M HCl (commercially available from J. T. Baker of Phillipsburg, N.J.) was added to adjust the pH of the aqueous layer to 4. The organic layer was then discarded and the aqueous layer partitioned with two additional 30 ml portions of cyclohexane. The final aqueous phase was adjusted to pH 12 through the addition of concentrated ammonium hydroxide (commercially available from J. T. Baker). The alkaline aqueous sample was then extracted with three 50 ml portions of methyl-t-butyl ether (commercially available from Burdick and Jackson of Muskeegon, Mich.) which were pooled and washed with two equal volumes of saturated aqueous solution of sodium chloride. After washing, the ether phase was dried over anhydrous sodium sulfate (commercially available from J. T. Baker) and was concentrated to dryness in vacuo. The product was vacuum distilled at 100° C. and 0.6 mm Hg.

The final product was 96% pure by GC/FID analysis using a 30 meter DB-5 column (J&W Scientific, Folsom, Calif.). Spectroscopic analysis using mass spectrometry, FTIR and NMR was consistent with triallyl-3-(N,N-diethylaminopropyl) silane.

Example 10

Example 10 describes the preparation of triallyl-3 (diethylphosphonopropyl) silane and triallyl silyl-(3-propylphosphonic acid).

Triallyl silyl-3-propylphosphonic acid was prepared from the triallyl bromopropyl silane prepared as in Example 7 via the diethyl phosphonate ester intermediate. A 100 ml flask equipped with stir bar and reflux condenser was charged with 17.6 grams (60 millimoles) of 93% triallyl bromopropyl silane (prepared as described in Example 7) and 30.4 grams (180 millimoles) of triethyl phosphite (commercially available from Aldrich Chemical Co. of Milwaukee, Wis.). The solution was stirred under positive nitrogen pressure while the sample was refluxed at 165° C. in an oil bath overnight. Unreacted phosphite reagents were removed using a rotary evaporator at 80° C. The majority of the remaining reagents and impurities were removed by vacuum distillation at 50° C.–150° C. and 1 mm Hg to yield triallyl-3(diethylphosphonopropyl) silane, which was 98% pure as measured using capillary GC/FID with a 30 meter DB-5 column. Spectroscopic analysis using mass spectrometry, FTIR and NMR was consistent with triallyl-3(diethylphosphopropyl) silane.

The free phosphonic acid product was prepared by hydrolysis of the triallyl-3-(diethylphosphonopropyl) silane in acidic aqueous solution.

Example 11

Example 11 describes the preparation of triallyl glycerylpropyl silane.

Triallyl glycerylpropyl silane was prepared from triallyl bromopropyl silane prepared in Example 7 via glycerol acetonide intermediate. A 250 ml flask equipped with a stir bar was charged with 22.9 grams of 74% triallyl bromopropyl silane reagent (17.0 grams, 62 millimoles of triallyl bromopropyl silane prepared as described in Example 7). The silane was diluted with 175 ml of tetrahydrofuran (commercially available from Aldrich Chemical Co. of Milwaukee, Wis.) containing 1.1 grams (3.2 millimoles) tetrabutylammonium hydrogen sulfate (commercially available from Aldrich Chemical Co.). The reaction vessel was then cooled in an ice bath and purged with nitrogen.

Next, the reaction vessel was charged with 16.86 grams (128 millimoles) of freshly distilled solketal (the acetone ketal of glycerine, commercially available from Aldrich Chemical Co.) and the solution was stirred rapidly while 32 grams of chilled 50% sodium hydroxide (commercially available from Aldrich Chemical Co.) solution were added. The bath was allowed to warm to room temperature. The solution was then stirred for 48 hours while the sample was purged with nitrogen. The organic phase was then decanted and saved. The aqueous phase was diluted four-fold with water and extracted with two 50 ml portions of methyl-t-butyl ether (commercially available from Burdick and Jackson of Muskeegon, Mich.). The organic phases were then combined and rotoevaporated to remove the ether. The remaining sample was separated by Flash Chromatography on a 25 gram bed of Merck 230–400 mesh (38–63 micrometers) silica (commercially available from Aldrich Chemical Co.) using 25/75 v/v methyl-t-butyl ether/cyclohexane (commercially available from E. Merck of Gibbstown, N.J.) to remove quaternary ammonium salts, the tetraallyl silane and most of the solketal and triallyl bromopropyl silane reagents. The sample was then vacuum distilled, with the triallyl glycerylpropyl silane acetonide collected at 125° C. and 0.06 mm Hg.

The triallyl glycerylpropyl silane acetonide prepared in this way was 90%–92% pure. A sample was then purified further to yield product that was 98% pure.

A 0.75 gram sample of the 98% pure acetonide product prepared as above was converted to the diol by overnight hydrolysis in 2 ml of a 10% acetic acid (Aldrich Chemical Co.) in water and 1 ml of n-butanol (commercially available from Aldrich Chemical Co.) at 50° C. The solvents were removed by rotoevaporation and the diol was purified by liquid chromatography on silica using an increasing gradient of methyl-t-butyl ether versus hexane (Burdick and Jackson) . The chromatographic faction was then re-concentrated by rotary evaporation to provide a pure preparation of triallyl-(3-glycerylpropyl) silane. Spectroscopic analysis using mass spectrometry, FTIR and NMR was consistent with triallyl-(3-glycerylpropyl)silane.

Example 12

Example 12 describes the preparation of triallyl (3-hydroxypropyl) silane.

Triallyl (3-hydroxylpropyl) silane was prepared from triallyl-3-bromopropyl silane prepared in Example 7 via the formyloxypropyl intermediate. A 100 ml flask equipped with stir bar and reflux condenser was charged with 10.0 grams (36 millimoles) of triallyl 3-bromopropyl silane (prepared as described in Example 7), 4.90 grams (72 millimoles) sodium formate (commercially available from Aldrich Chemical Co. of Milwaukee, Wis.) and 0.60 grams of tetrabutyl ammonium bromide (commercially available from Aldrich Chemical Co.). The suspension was stirred at 110° C. for two days. The solution was then filtered and combined with equal volumes of deionized water and cyclohexane (commercially available as Omnisolve from E. Merck of Gibbstown, N.J.). The organic extract was flash chromatographed on silica using first cyclohexane, followed by 80/20 cyclohexane/acetone to collect the triallyl formyloxypropyl silane intermediate.

The triallyl formyloxypropyl silane intermediate was converted to the hydroxylpropyl product by charging 5.0 grams of the intermediate, together with 50 ml of methanol (commercially available from Burdick and Jackson of Muskeegon, Mich.) and 10 ml of deionized water, in a 250 ml flask with stir bar. 1.0 gram (10 millimoles) of potassium hydrogen carbonate (commercially available from Aldrich Chemical Co.) was added to the solution, which was then stirred at 50° C. for five hours. The solution was filtered and was concentrated in vacuo. The sample was then taken up in cyclohexane and was washed with saturated aqueous sodium chloride before drying over anhydrous sodium sulfate (commercially available from Aldrich Chemical Co.). The sample was then purified using flash chromatography on silica with 99/1 cyclohexane/acetone eluent initially, followed by 80/20 cyclohexane/acetone. The recovered fractions were concentrated in vacuo to yield triallyl 3-hydroxypropyl silane, as shown by capillary GC/FID analysis using a 30 meter DB-5 column. Spectroscopic analysis using mass spectrometry, FTIR and NMR was consistent with triallyl-3-hydroxypropyl silane.

Example 13

Example 13 describes the preparation of triallyl tridecafluorotetrahydrooctyl silane.

Triallyl tridecafluorotetrahydrooctyl silane was prepared from its trichloro silane analogue using allyl Grignard reagents. A 125 ml flask, equipped with stirring bar and a delivery funnel with polytetrafluoroethylene stopcock, was charged with 7.78 grams (16 millimoles) of (tridecafluoro-1,1,2,2-tetrahydrooctyl)-1-trichlorosilane (United Chemical Technologies, Piscataway, N.J.) under nitrogen purge conditions. The silane was diluted with 50 ml of tetrahydrofuran (Burdick and Jackson, Muskeegon, Mich.). A 25.0 ml (50 millimoles) portion of a 2M solution of allyl magnesium chloride in tetrahydrofuran (Aldrich Chemical Co.) was then added dropwise to the stirred solution, forming magnesium chloride precipitate in an initially strongly exothermic reaction.

After 1 hour had elapsed, an additional 1 ml of the allyl magnesium chloride reagent was added to the sample, which was then stirred overnight at room temperature and under nitrogen purging. Excess Grignard reagent was consumed by the addition of 10 ml of methanol (Burdick and Jackson), after which the slurry was stirred for another hour. The magnesium chloride precipitate was collected by filtration through filter paper and the precipitate was washed with two 10 ml portions of tetrahydrofuran. The filtrate and the wash solutions were then combined to yield a reagent solution. This sample was evaluated by capillary GC/FID and GC/MS using a 30 meter DB-5 column. Based on these results, the solution contained about 10 weight percent of a 95%; pure component. Spectroscopic analysis using gas chromatography and mass spectrometry were consistent with triallyl tridecafluorotetrahydrooctyl silane.

Example 14

Example 14 describes the preparation of trivinyl methoxy silane.

Trivinyl methoxy silane was prepared from trichlorosilane via a trivinyl hydrosilane intermediate. A 2 L two necked flask, equipped with a mechanical stirrer, a 100 ml pressure equalizing additional funnel with inert stopcock, a cold finger condenser and a nitrogen purge inlet, was charged with 800 ml (1.34 mole) of a 15% solution of vinyl magnesium chloride in tetrahydrofuran (commercially available from Janssen Chimica of Geel, Belgium). The addition funnel was charged with a solution consisting of 43.9 ml (0.435 mole) of trichlorosilane (commercially available from Aldrich Chemical Co. of Milwaukee, Wis.) and 43.9 ml of decahydronaphthalene (commercially available from Burdick and Jackson of Muskeegon, Mich.). The reaction flask was cooled in an ice bath and the trichlorosilane solution was added dropwise with stirring. Addition of the silane resulted in formation of magnesium chloride precipitate.

After addition of the silane reagent was complete, the sample was kept cold for 30 minutes, after which the slurry was stirred at room temperature for 4 hours. Excess Grignard reagent was quenched by the addition of saturated ammonium chloride solution. The precipitates were removed by filtration as described in Example 1 and the bed was washed with two 100 ml portions of decahydronaphthalene, which were then added to the filtrate. The organic fraction was then distilled and the fractions from 50° C.–150° C. collected.

The resulting product consisted of 8% trivinyl hydrosilane in tetrahydrofuran/decahydroanphthalene solvent. This preparation can be converted directly to the alkoxy derivative, or can be purified further by washing twice each with equal volumes of 3% aq sodium chloride, 2.5% aq sodium chloride and water in order to remove tetrahydrofuran. The resulting organic fraction is dried over molecular sieves and then distilled at 84° C.–87° C. to yield the purified product.

Trivinyl hydrosilane was converted to trivinyl methoxy silane by combining 150 ml of the crude solution in tetrahydrofuran/decahydronaphthalene with an equal volume of dry methanol (commercially available as Omnisolve from Aldrich Chemical Co. of Milwaukee, Wis.) in a 2 L two necked flask equipped with stir bar, cold finger condenser and a septum seal. A solution of 56 milligrams of sodium methoxide (commercially available from Aldrich Chemical Co.) was dissolved in 5 ml of methanol and added dropwise to the flask. The reaction flask was then immersed in a room temperature water bath to control the exothermic reaction. After 4 hours, an additional 0.5 ml of a fresh solution of sodium methoxide was added to the reaction, which was left stirring overnight. The trivinyl methoxy silane was recovered by distillation of the product at 119° C.–120° C.

This process yielded 96% trivinyl methoxy silane, as determined by gas chromatography and FID analysis on a 30 meter DB-5 column. Spectroscopic analysis using mass spectrometry, FTIR and NMR was consistent with trivinylmethoxy silane.

Example 15

Example 15 describes the preparation of triallyl methoxy silane.

Triallyl methoxy silane was prepared from trichlorosilane via the triallyl hydrosilane intermediate following the procedure described in Example 14. A 500 ml two-necked flask, equipped with a mechanical stirrer, a 100 ml pressure equalizing additional funnel with inert stopcock, a cold finger condenser and a nitrogen purge inlet, was charged with 197 ml (394 millimoles) of a 2M solution of allyl magnesium chloride in tetrahydrofuran (commercially available from Aldrich Chemical Co. of Milwaukee, Wis.).

The addition funnel was charged with a solution consisting of 12.5 ml (0.124 mole) of trichlorosilane (commercially available from Aldrich Chemical Co.) and 12.5 ml of dry pentane (commercially available from Aldrich Chemical Co.). The reaction flask was cooled in an ice bath and the trichlorosilane solution was added and reacted as described in Example 14. After quenching excess Grignard reagent with saturated ammonium chloride solution, the sample was filtered to remove precipitate and yield triallyl hydrosilane. This material can be directly converted to the methoxy derivative (as described below) or purified further by vacuum distillation at 55° C.–57° C. and 20 mm Hg.

Triallyl hydrosilane was converted to triallyl methoxy silane by combining 13 grams of triallyl hydrosilane with 50 ml of dry methanol (commercially available from Burdick and Jackson, Muskeegon of Mich.) in a 125 ml flask equipped with a stir bar and a septum seal. A solution of 250 milligrams of sodium methoxide (commercially available from Aldrich Chemical Co.) was prepared in 5 ml of methanol and was added to the flask in 100 microliter increments. The reaction flask was then immersed in a room temperature water bath to control the exothermic reaction. When gas evolution ceased, an additional 1 ml of a fresh solution of sodium methoxide was added to the reaction, which was then left stirring overnight. The methanol was removed by distillation while the triallyl methoxy silane was isolated by vacuum distillation of the remaining sample at 65° C. and 10 mm Hg.

This process yielded 99% triallyl methoxy silane by GC/FID analysis on a 30 meter DB-5 column. Spectroscopic analysis using mass spectrometry, FTIR and NMR was consistent with triallyl-methoxy silane.

Example 16

Example 16 describes the preparation of a triallyl octadecylsilyl polymeric bonded phase on a zirconia chromatographic support.

12 grams of a zirconia ($ZrO_2$) chromatographic support gel (generally described in Carr et al., U.S. Pat. No. 5,015,373, hereby incorporated by reference, and characterized as having an average particle diameter of 7 $\mu$m; a surface area of 33 $m^2$/gram; an average pore diameter of 165 Å; and a specific pore volume of 0.14 ml/gram) was washed with 0.1N NaOH and then dried at 150° C. for two hours. The gel was then transferred into a 100 ml round bottom flask and suspended in 20 grams of hexane (available from Burdick and Jackson, Muskeegon, Mich.), which was then outgassed with vacuum and ultrasonication.

The resulting slurry was charged with 0.51 gram of triallyl octadecyl silane (prepared as described in Example 2, 1.3 millimoles) and 30 milligrams of dicumyl peroxide (available from Aldrich Chemical Co., Milwaukee, Wis.). The slurry was rotated at 90 rpm for 5 minutes in a room temperature water bath before the solvent was removed by rotoevaporation over a 10 minute period. The sample was then outgassed with evacuation and $N_2$ purge cycles. After a final evacuation, the sample flask was immersed in the 180° C. oil bath where it was cured in vacuo for 3 hours. After curing, the sample was cooled under vacuum and collected on a Buchner funnel, where it was washed to remove unbonded monomer. The washed gel was then dried overnight to remove residual solvent. Carbon combustion analysis of the final product indicated 2.5% C which corresponds to a coverage of 2.5 micromoles octadecyl silane/$m^2$.

Example 17

Example 17 describes the preparation of a trivinyl octylsilyl polymeric bonded phase on a zirconia chromatographic support.

The procedure of Example 16 was followed except that 0.31 gram of trivinyl octyl silane (prepared as described in Example 4, 3.9 millimoles) and 51 milligrams of dicumyl peroxide were used. Carbon combustion analysis of the final product indicated 2.0% C which corresponds to a coverage of 3.8 micromole octyl silane/$m^2$.

Example 18

Example 18 describes the preparation of trivinyl octadecylsilyl polymeric bonded phase on a silica chromatographic support.

The procedure of Example 16 was followed except that the support material was a silica ($SiO_2$) chromatographic support (commercially available as "Impaq R60610Si" from the PQ Corporation of Valley Forge, Pa., characterized as having an average particle diameter of 10 micrometers; a surface area of 579 $m^2$/gram; an average pore diameter of 62 Å; and a specific pore volume of 0.90 ml/gram). 2.03 grams of the $SiO_2$ support material were used. In addition, the polymer was prepared by free radical polymerization of trivinyl octadecyl silane (prepared as described in Example 1, 1.20 grams, 3.32 millimoles) using, as the initiator, 98 milligrams of benzoyl peroxide (available from Aldrich Chemical Co., Milwaukee, Wis.). Carbon combustion analysis of the final product indicated 18.4% C which corresponds to a coverage of 1.14 micromoles octadecyl silane/$m^2$.

Example 19

Example 19 describes the preparation of a triallyl octylsilyl polymeric bonded phase on a chromatographic alumina support.

The procedure of Example 16 was followed except that the support material was an alumina ($Al_2O_3$) chromatographic support (commercially available as "Spherisorb $Al_2O_3$" from the Phase Separations Inc. of Norwalk, Conn., characterized as having an average particle diameter of 10 micrometers; a surface area of 105 $m^2$/gram; an average pore diameter of 167 Å; and a specific pore volume of 0.44 ml/gram). 4.31 grams of the $Al_2O_3$ support material were used. In addition, the polymer was prepared by free radical polymerization of triallyl octyl silane (prepared as described in Example 5, 3.4 millimoles, 0.41 gram) using 49 milligrams of benzoyl peroxide as the initiator. Carbon combustion analysis of the final product indicated 3.8% C which corresponds to a coverage of 1.9 micromoles octyl silane/$m^2$.

Example 20

Example 20 describes the preparation of a triallyl octadecylsilyl polymeric bonded phase on a carbon clad $ZrO_2$ chromatographic support.

The procedure of Example 16 was followed except that the support was a carbon clad $ZrO_2$ chromatographic support prepared by treating the $ZrO_2$ chromatographic gel in Example 16 with butanol vapor at 700° C. under reduced pressures as described in U.S. Pat. No. 5,108,597. The support was characterized as having a surface area of 20.1 $m^2$/gram; an average pore diameter of 155 Å; and a specific pore volume of 0.11 ml/gram. Carbon combustion analysis of this support yielded a carbon content of 1.30%.

13 grams of the carbon clad $ZrO_2$ support material was washed with 25 ml each of 0.1N potassium hydroxide in methanol, acetonitrile and hexane, and then dried for 30 minutes at 110° C. Next, a 100 ml round bottom flask was charged with 12.42 grams of the washed and dried carbon clad $ZrO_2$, which was slurried in 15 grams of hexane and 5 grams of unstabilized tetrahydrofuran (available from Burdick and Jackson, Muskeegon, Mich.) and then outgassed with vacuum and ultrasonication. To the slurry was added 0.59 gram of triallyl octadecyl silane reagent (prepared as described in Example 2, 1.5 millimoles) and 70 milligrams of dicumyl peroxide. The procedure of Example 16 was then followed to yield the final product. Carbon combustion analysis of the final product indicated 3.13% C, which represents an increase of 1.83% C, or a coverage of 2.0 micromoles octadecyl silane/$m^2$.

Example 21

Example 21 describes the preparation of a tributenyl octadecylsilyl dimercaptan copolymeric bonded phase on a zirconia chromatographic support.

An octadecyl functionalized polymeric carbosilane bonded phase was prepared on the zirconia ($ZrO_2$) chromatographic support used in Example 16 by photoinitiated copolymerization of tributenyl octadecyl silane and ethylene glycol bis (mercaptoethyl ether) on the support as follows. 15 grams of the $ZrO_2$ gel was weighed into a 100 ml round bottom flask and suspended in 30 grams of cyclohexane (commercially available from Burdick and Jackson, Muskeegon, Mich.), after which it was outgassed with vacuum and ultrasonication. Next, the slurry was charged with 0.225 gram of 70% tributenyl octadecyl silane reagent (prepared as described in Example 3, 0.35 millimoles), 0.134 gram of 1,8-dimercapto-3,6-dioxaoctane (commercially available from Itochu Specialty Chemical Co of White Plains, N.Y., 0.73 millimole) and 90 milligrams of 2,2'-dimethoxy-2-phenyl acetophenone photoinitiator (commercially available from Aldrich Chemical Co.). The slurry was rotated at 90 rpm for 5 minutes in a room temperature water bath before the solvent was removed by rotoevaporation over a 15 minute period. While under vacuum, the sample was exposed to UV radiation (350 nm) for 150 seconds, one third time at an intensity of 1.0 mW/$cm^2$ and the remaining two thirds time at an intensity of 2.2 mW/$cm^2$ (as measured by a UVIMAP VR 365CH3 radiometer). After curing, the sample was collected on a Buchner funnel, where it was washed to remove unbonded monomer. The washed gel was then dried overnight to remove residual solvent. Carbon and sulfur combustion analysis of the final product indicated 1.3% C and 0.3% S which corresponds to coverages of 1.4 micromoles octadecyl silane/m$^2$ and 0.8 micromole mercaptan/m$^2$.

Example 22

Example 22 describes the preparation of a triallyl octadecylsilyl—epoxyhexenyl copolymeric bonded phase on a zirconia chromatographic support An octadecyl functionalized polymeric carbosilane bonded phase, covalently bound to the gel surface, was prepared on the ZrO$_2$ chromatographic support (described in Example 16) by free radical copolymerization of triallyl octadecyl silane and epoxy hexene on the support according to the procedure described in Example 16 except that 0.15 gram of 1,2 -epoxy hexene (available from Aldrich Chemical Co., Milwaukee, Mich.) was added to the ZrO$_2$ slurry in hexane prior to addition of the triallyl octadecyl silane and dicumyl peroxide. Under these conditions, the epoxy reagent reacted with surface hydroxyls to yield a hexene-substituted ZrO$_2$ surface which was then copolymerized with the triallyl silane. Carbon combustion analysis of the final product indicated 3.0% C which corresponds to a coverage of 1.7 micromoles/m$^2$ epoxy hexene and 2.5 micromoles/m$^2$ octadecyl silane.

Example 23

Example 23 describes the preparation of a triallyl octadecylsilyl—allyl glycidyl ether copolymeric bonded phase on a zirconia chromatographic support.

An octadecyl functionalized polymeric carbosilane bonded phase, covalently bound to the surface of a zirconia chromatographic support, was prepared according to the procedure of Example 16 except that 10.7 grams of the support material was used. The polymer was prepared by free radical copolymerization of triallyl octadecyl silane (prepared as described in Example 2, 1.7 millimoles, 0.70 gram) and allyl glycidyl ether (available from Aldrich Chemical Co., Milwaukee, Wis., 2.1 millimoles, 0.24 gram) on the support using, as the initiator, 50 milligrams of dicumyl peroxide. Carbon combustion analysis of the final product indicated 5.4% C which corresponds to a coverage of 1.4 micromoles/m$^2$ allyl glycidyl ether and 2.6 micromoles/m$^2$ octadecyl silane.

Example 24

Example 24 illustrates the preparation of a trivinyl octadecylsilyl polymeric bonded phase on a vinyl phosphonate treated zirconia chromatographic support.

The procedure of Example 16 was followed except that the support was a vinyl phosphonate treated zirconia support prepared by suspending 12.70 grams of ZrO$_2$ (described in Example 16) in 50 ml of water, and then outgassing with ultrasonication and vacuum. 0.40 gram of vinyl phosphonate (available from Aldrich Chemical Co., Milwaukee, Wis., 3.7 millimoles) was added to the slurry and the pH was adjusted to 7.4 using ammonium hydroxide, after which the sample was equilibrated for 15 minutes. The vinyl phosphonate treated ZrO$_2$ gel was recovered by filtration and was washed with 10 ml each of deionized water and acetonitrile, and then dried for two hours at 110° C. Carbon combustion analysis of the vinyl phosphonated product indicated 0.25% C which corresponds to a vinyl phosphonate coverage of 3.2 micromoles/m$^2$.

A 100 ml round bottom flask wash charged with 11.04 grams of the dried vinyl phosphonate treated ZrO$_2$, which was suspended in 20 grams of hexane (available from Burdick and Jackson, Muskeegon, Mich.) and was outgassed with vacuum and ultrasonication. To the slurry was added 0.53 gram of trivinyl octadecyl silane (prepared as described in Example 1, 1.5 millimoles) together with 30 milligrams of dicumyl peroxide and 25 milligrams of benzoyl peroxide (available from Aldrich Chemical Co.). The procedure of Example 16 was followed to yield the final product. Carbon combustion analysis of the final product indicated 4.0% C which corresponds to a coverage of 4.1 micromoles/m$^2$ octadecyl silane.

Example 25

Example 25 describes the preparation of a triallyl (3-glycerylpropyl)silyl polymeric bonded phase on a zirconia chromatographic support.

11.2 grams of the ZrO$_2$ gel described in Example 16 was washed with 25 ml of 0.1N NaOH and unstabilized tetrahydrofuran (available from Burdick and Jackson, Muskeegon, Mich.). A 100 ml round bottom flask was charged with 12.9 grams of the alkaline, water rich gel, which was suspended in 20 grams of tetrahydrofuran and then outgassed with vacuum and ultrasonication. To the slurry was added 0.75 gram of triallyl (3-glycerylpropyl)silane acetonide (prepared as described in Example 11, 2.3 millimoles) and 88 milligrams of dicumyl peroxide (available from Aldrich Chemical Co.). The slurry was rotated at 90 rpm for 10 minutes in a 40° C. water bath before the solvent was removed by rotoevaporation over a 10 minute period while the sample was heated to 60° C. The sample was then outgassed with evacuation and N$_2$ purge cycles. After a final evacuation, the sample flask was immersed in the 180° C. oil bath where it was cured in vacuo for 3 hours. After curing, the sample was cooled under vacuum and resuspended in 50 ml of 1:1 methanol/1N HCl, and outgassed with vacuum and ultrasonication.

The sample was heated overnight at 70° C. to hydrolyze the acetonide to the diol form. The hydrolyzed sample was recovered on a Buchner funnel, where it was washed to remove unbonded monomer. The washed gel was then dried overnight to remove residual solvent. Carbon combustion analysis of the final product indicated 3.8% C which corresponds to a coverage of 6.9 micromoles/m$^2$ of diol silane.

Example 26

Example 26 describes the preparation of a triallyl (aminopropylsilyl) allyl glycidyl ether copolymeric bonded phase on a zirconia chromatographic support.

The procedure of Example 16 was followed except that 13 grams of the ZrO$_2$ gel was washed with of 0.1N NaOH, water and acetonitrile, and then dried at 110° C. for two hours. A 100 ml round bottom flask wash charged with 12.78 grams of the washed and dried gel, which was suspended in 20 grams of hexane and then outgassed with vacuum and ultrasonication. To the resulting slurry was added 0.29 gram of allyl glycidyl ether (available from Aldrich Chemical Co., 2.6 millimoles) and 0.56 gram of triallyl(N,N-diethyl-3-aminopropyl)silane (prepared as described in Example 9, 2.1 millimoles), and, as the initiator, 73 milligrams of dicumyl peroxide. The procedure of Example 16 was then followed to yield the final product. Carbon and nitrogen combustion analysis of the final product indicated 2.8% C and 0.2% N which corresponds to a coverage of 3.6 micromoles/m$^2$ of amino silane.

Example 27

Example 27 describes the preparation of a triallyl (phosphonopropyl)silyl polymeric bonded phase on a zirconia chromatographic support.

10 grams of the $ZrO_2$ gel described in Example 16 was washed with 0.1N NaOH, water and acetonitrile, and then dried at 110° C. for two hours. A 100 ml round bottom flask was charged with 9.06 grams of the washed and dried gel, which was suspended in 20 grams of hexane and then outgassed with vacuum and ultrasonication. To the slurry was added 0.59 gram of triallyl 3-phosphonopropyl silane diethyl ester (prepared as described in Example 10, 1.9 millimoles). After 3.5 hours, 92 milligrams of dicumyl peroxide (available from Aldrich Chemical Co.) was added to the slurry, which was then rotated at 90 rpm for 5 minutes in a room temperature water bath before the solvent was removed by rotoevaporation over a 15 minute period. The sample was then outgassed with evacuation and $N_2$ purge cycles. After a final evacuation, the sample flask was immersed in the 180° C. oil bath where it was cured in vacuo for 3 hours.

After curing, the sample was cooled under vacuum and was resuspended in 50 ml of 1:1 acetonitrile/1N HCl, and then outgassed with vacuum.

Next, the sample was heated overnight to hydrolyze the esters to the free acid forms. The hydrolyzed sample was recovered on a Buchner funnel, where it was washed to remove unbonded monomer. The washed gel was then dried overnight to remove residual solvent. Carbon combustion analysis of the final product indicated 1.6% C which corresponds to a coverage of 3.4 micromoles/m² of alkyl phosphonic acid silane.

Example 28

Example 28 describes the preparation of a trivinyl octadecylsilyl—octadecylsilyl copolymeric bonded phase on an allyl silane-treated zirconia chromatographic support.

Allyl silanized $ZrO_2$ was prepared by suspending 15.2 grams of the $ZrO_2$ support material described in Example 16 in 25 ml of toluene in a 125 ml flask, and outgassing with ultrasonication and vacuum. 0.76 gram of allyl triethoxy silane (available from Aldrich Chemical Co., Milwaukee, Wis., 3.7 millimoles) was added to the slurry. The sample was heated at 100° C. for 40 hours, after which the allyl silanized $ZrO_2$ gel was recovered by filtration and was washed to remove unbonded silane. Carbon combustion analysis of the allyl silanized product indicated 0.65% C which corresponds to a polymeric allyl silane coverage of 5.6 micromoles/m².

A 125 ml iodine flask was charged with 7.05 grams of allyl silanized $ZrO_2$ suspended in 15 grams of hexane (available from Burdick and Jackson, Muskeegon, Mich.) and then outgassed with vacuum and ultrasonication. The slurry was charged with 0.41 gram of trivinyl octadecyl silane (prepared as described in Example 1, 1.1 millimoles) and 0.33 gram of octadecyl silane (available from United Chemical Technologies of Bristol, Pa., 1.2 millimoles). An 80 milligram sample of chloroplatinic acid (available from Aldrich Chemical Co., 0.2 millimole) was dissolved in 2 ml of unstabilized tetrahydrofuran (available from Burdick and Jackson) and was added to the slurry. The flask was purged with nitrogen and stoppered with a pressure-sealing polytetrafluoroethylene stopper, and then heated at 100° C. for 20 hours. The sample was then allowed to sit at room temperature for 24 hours. The sample was recovered on a Buchner funnel, where it was washed to remove unbound reagents. The washed gel was then dried overnight to remove residual solvent. Carbon combustion analysis of the final product indicated 1.6% C.

Example 29

Example 29 describes the preparation of a trivinyl octadecylsilyl—octadecylsilyl copolymeric bonded phase on a zirconia chromatographic support.

11 grams of the $ZrO_2$ gel described in Example 16 was washed with 0.1N NaOH, water and acetonitrile, and then dried overnight at 110° C. A 100 ml round bottom flask was charged with 10.53 grams of the washed and dried $ZrO_2$, which was suspended in 15 grams of hexane and 15 grams of unstabilized tetrahydrofuran (available from Burdick and Jackson, Muskeegon, Mich.) and then outgassed with vacuum and ultrasonication. To the slurry was added 0.38 gram of trivinyl octadecyl silane (prepared as described in Example 1, 1.1 millimoles) together with 0.11 gram of octadecyl silane (available from United Chemical Technologies of Bristol, Pa., 0.38 millimole) and 27 milligrams of 2,2'-azobis(2-methylpropionitrile) (available from Eastman Fine Chemicals of Rochester, N.Y., 0.16 millimole). The flask was purged with nitrogen and stoppered with a pressure-sealing polytetrafluoroethylene stopper, and then heated at 100° C. for 5 hours.

Next, the sample was spiked with 20 milligrams of dicumyl peroxide (available from Aldrich Chemical Co., Milwaukee, Wis.). The procedure of Example 16 was then followed to yield the final product. Carbon combustion analysis of the final product indicated 3.32% C.

Example 30

Example 30 describes the preparation of a triallyl methoxysilyl—octadecylsilyl copolymeric bonded phase on a zirconia chromatographic support.

An octadecyl-functionalized polymeric carbosilane bonded phase, covalently bound to the gel surface, was prepared on the $ZrO_2$ chromatographic support described in Example 16 according to the procedure described in Example 16 except that 11.5 grams of the $ZrO_2$ gel was washed with 0.1N NaOH, water and acetonitrile, and then dried overnight at 110° C. A 100 ml round bottom flask was charged with 11.05 grams of the washed and dried $ZrO_2$, which was suspended in 20 grams of hexane and then outgassed with vacuum and ultrasonication. To the slurry was added 0.39 gram of triallyl methoxy silane (prepared as described in Example 15, 2.2 millimoles) together with 0.43 gram of octadecyl silane (available from United Chemical Technologies of Bristol, Pa., 1.5 millimoles) and 70 milligrams of dicumyl peroxide (available from Aldrich Chemical Co., Milwaukee, WI, 0.26 millimole). The procedure of Example 16 was then followed to yield the final product. Carbon combustion analysis of the final product indicated 4.56% C.

Various modifications and alterations of this invention will become apparent to those skilled in the art without departing from the scope and spirit of this invention, and it should be understood that this invention is not to be limited to the illustrative embodiments set forth herein.

What is claimed is:

1. A method of preparing a coated particle comprising the steps of:

contacting a surface of a substrate with a silane comprising (a) two or three olefinic groups having the formula —$(CH_2)_m CH{=}CH_2$, where m is between 0 and 3, inclusive, and (b) at least one ligand; and polymerizing the silane on at least a portion of the surface of the substrate to form a polymerization product comprising a backbone that is essentially free of siloxane linkages.

2. The method according to claim 1 comprising contacting the substrate with the silane and a trihydrosilane; and copolymerizing the silane and the trihydrosilane with each other on at least a portion of the surface of the substrate.

3. The method according to claim 1 further comprising pre-treating the surface of the substrate to create surface-bonded groups that can react with the silane.

4. The method according to claim 1 comprising contacting the substrate with a silane comprising three olefinic groups having the formula —$(CH_2)_m CH{=}CH_2$, where m is between 0 and 3, inclusive.

5. The method according to claim 1 comprising contacting the substrate with a silane in which the ligand comprises hydrogen, a halogen, an alkoxy group, an aryl group, a derivatized aryl group, an alkyl group, or a derivatized alkyl group.

6. The method according to claim 1 comprising contacting the substrate with a silane in which at least one of the olefinic groups has the formula —$CH_2 CH{=}CH_2$.

7. The method according to claim 1 comprising contacting the substrate with a silane in which at least one of the olefinic groups has the formula —$CH{=}CH_2$.

8. The method according to claim 1 comprising contacting the substrate with a silane comprising triallyloctadecylsilane.

9. The method according to claim 1 comprising contacting the substrate with a silane comprising trivinyloctadecylsilane.

10. The method according to claim 1 comprising contacting the substrate with a silane comprising triallyoctylsilane.

11. The method according to claim 1 comprising contacting the substrate with a silane comprising trivinyloctylsilane.

* * * * *